(12) United States Patent  
Savioz

(10) Patent No.: US 11,045,039 B2  
(45) Date of Patent: *Jun. 29, 2021

(54) HEAT TRANSFER DEVICE AND SYSTEM INTEGRATING SUCH A DEVICE

(71) Applicant: NESTEC S.A., Vevey (CH)

(72) Inventor: Gregory Savioz, Saxonne (CH)

(73) Assignee: Societe des Produits Nestle S.A., Vevey (CH)

( * ) Notice: Subject to any disclaimer, the term of this patent is extended or adjusted under 35 U.S.C. 154(b) by 599 days.

This patent is subject to a terminal disclaimer.

(21) Appl. No.: 15/538,779

(22) PCT Filed: Dec. 14, 2015

(86) PCT No.: PCT/EP2015/079535  
§ 371 (c)(1),  
(2) Date: Jun. 22, 2017

(87) PCT Pub. No.: WO2016/102219  
PCT Pub. Date: Jun. 30, 2016

(65) Prior Publication Data  
US 2017/0367528 A1 Dec. 28, 2017

(30) Foreign Application Priority Data

Dec. 24, 2014 (EP) .................................. 14200272

(51) Int. Cl.  
*A47J 31/54* (2006.01)  
*A47J 31/44* (2006.01)  
*A47J 31/60* (2006.01)  
*F28D 7/02* (2006.01)  
*F28D 1/06* (2006.01)  
(Continued)

(52) U.S. Cl.  
CPC ......... *A47J 31/542* (2013.01); *A47J 31/4485* (2013.01); *A47J 31/60* (2013.01);  
(Continued)

(58) Field of Classification Search  
CPC .. A47J 31/407; A47J 31/542; A47J 27/21016; A47J 31/4489; F22B 1/282; F22B 1/28  
(Continued)

(56) References Cited

U.S. PATENT DOCUMENTS 6,459,854 B1 * 10/2002 Yoakim ................... F24H 1/142  
392/479  
9,980,601 B2 * 5/2018 Feijen ................... A47J 43/121  
(Continued)

FOREIGN PATENT DOCUMENTS

CN 103827621 A 5/2014  
CN 203802270 U 9/2014  
(Continued)

OTHER PUBLICATIONS

Office Action Received for Application No. 2017-533595, dated Dec. 17, 2019, 14 pages(7 pages of English translation and 7 pages of official copy).

*Primary Examiner* — Tu B Hoang  
*Assistant Examiner* — Vy T Nguyen  
(74) *Attorney, Agent, or Firm* — K&L Gates LLP

(57) ABSTRACT

Heat transfer device (10) for heating a fluid or a fluid foam on demand comprising a path (30) through which the fluid or the fluid foam circulates and at least one layer (11) made of a thermally conductive material, the path (30) being in contact with the layer (11) in such a way that when the layer (11) is heated it transmits heat to the fluid or fluid foam as it circulates through the path (30), wherein the path (30) and the part of the layer (11) in contact with said path (30) are detachably configured so that they are made accessible for being cleaned.

2 Claims, 9 Drawing Sheets

(51) Int. Cl.
  *F24H 7/02* (2006.01)
  *F28D 7/00* (2006.01)
(52) U.S. Cl.
  CPC ............... *F28D 1/06* (2013.01); *F28D 7/026* (2013.01); *F24H 7/0241* (2013.01); *F28D 7/0025* (2013.01)
(58) Field of Classification Search
  USPC .......... 99/453, 403, 342, 330; 426/115, 474, 426/523; 222/103, 145.5, 145.6, 207, 222/214; 219/441; 392/398
  See application file for complete search history.

(56) References Cited

U.S. PATENT DOCUMENTS

| | | | |
|---|---|---|---|
| 2009/0269044 A1* | 10/2009 | Yamakawa | ............. F24H 1/142 392/488 |
| 2014/0126896 A1 | 5/2014 | Wei et al. | |
| 2014/0322418 A1* | 10/2014 | Cowe | ...................... A47J 27/10 426/523 |
| 2015/0289710 A1* | 10/2015 | van Druten | ......... B01F 3/04248 426/115 |

FOREIGN PATENT DOCUMENTS

| | | |
|---|---|---|
| DE | 102008030541 | 12/2009 |
| FR | 2920654 | 3/2009 |
| JP | S55110989 U | 8/1980 |
| JP | H02261413 A | 10/1990 |
| JP | 2009511102 A | 3/2009 |
| WO | 8200343 | 2/1982 |
| WO | 2007039683 | 4/2007 |
| WO | 2009156190 | 12/2009 |
| WO | 2014077692 A2 | 5/2014 |
| WO | 2014096181 A1 | 6/2014 |

* cited by examiner

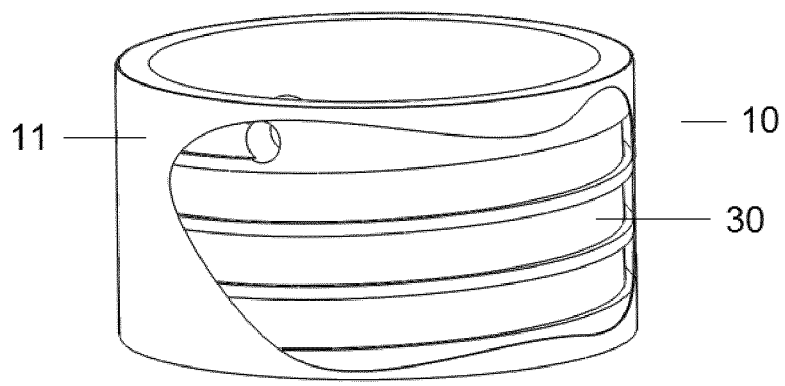
FIG. 7a
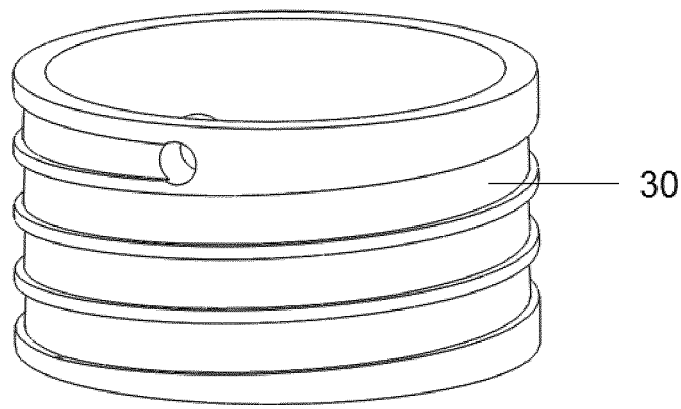
FIG. 7b
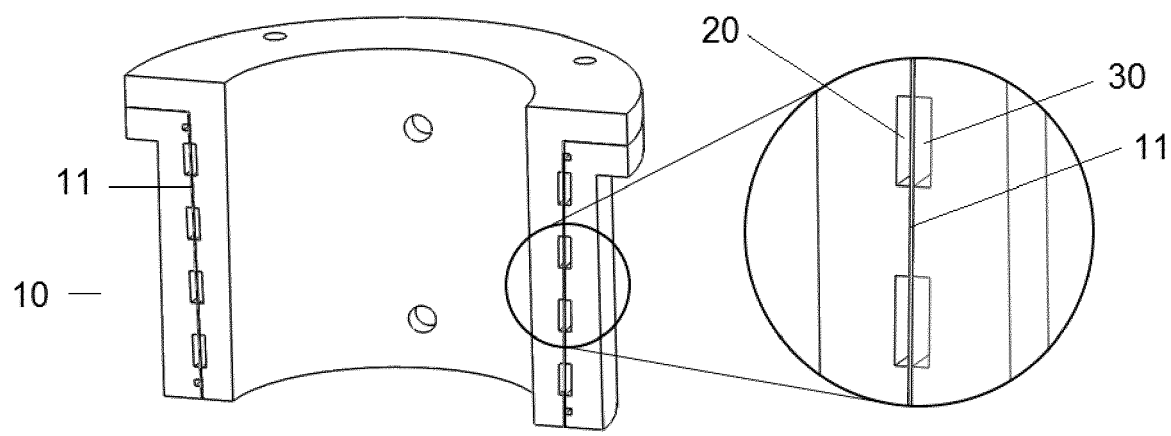
FIG. 8a
FIG. 8b

HEAT TRANSFER DEVICE AND SYSTEM INTEGRATING SUCH A DEVICE

CROSS REFERENCE TO RELATED APPLICATIONS

The present application is a National Stage of International Application No. PCT/EP2015/079535, filed on Dec. 14, 2015, which claims priority to European Patent Application No. 14200272.4, filed on Dec. 24, 2014, the entire contents of which are being incorporated herein by reference.

FIELD OF THE INVENTION

The present invention is directed to a heat transfer device for heating fluids or fluid foams on demand in an efficient and cleanable way. The invention further relates to a system integrating such a heat transfer device.

BACKGROUND OF THE INVENTION

Fluid foams consist of two phases, an aqueous phase and a gaseous (air) phase. A fluid foam is a substance which is formed by trapping many gas bubbles in a fluid structure: producing a fluid foam involves not only the generation of these gas bubbles, but also the packing and the retention of these bubbles into the overall fluid structure in order to provide a stable foam.

Nowadays, there exists the trend of consuming a wider variety of coffee types, most of them containing considerably more milk than before. These new coffee types comprise very often milk foams, so providing good quality foam which is stable for a long time is a present need. As a consequence, there is a strong need for a foam heating technology, particularly for a milk foam heating technology for a wide range of businesses, particularly involving beverage preparations. As for now, no practical cleaning solution exists and the consumer always has to clean parts of the machine through which milk circulated: this becomes a hassle when milk is involved because milk deteriorates rapidly with time and the system needs to be thoroughly cleaned very often, preferably after each use. Superior quality milk foam is also more and more required and the heating system has to be smartly designed so as not to decrease the foam quality and provide a superior in cup result, providing at the same time practical and easy cleaning ways.

At present, there exist current systems which are able to provide superior quality milk foam: this milk foam is generated from cold milk and is then heated up at a later stage so that the creamy texture is kept stable for a longer period of time: this entrains the difficulty of being able to heat up the foam without degrading its texture. There are different ways of heating up cold milk foam known in the state of the art. Some use a heat transfer device, such as for example a thermobloc, which heats the milk foam once it has been produced. The problem of using such heat transfer devices is that they need to be deeply cleaned every day as milk fluid circulates within the heat transfer device, can deteriorate and be a source of contamination when staying longer in the device. Moreover, these systems are cleaned preferably by being rinsed using several times the amount of water they would require for a normal operation or dosing. Some other known systems use a direct flow of steam through the milk foam already formed in order to heat it up: however, this destroys the texture of the milk foam thus providing very low quality foam in cup.

It is known in the state of the art, for example as per WO 2014/077692, a disposable heat exchanger comprising a flexible coil with a product inlet and a product outlet for a perishable product, such as a milk product: a heating medium is also provided surrounding the flexible coil in order to heat the perishable product which circulates through it. This document further discloses a frothing module, preferably disposed before the product outlet in the heat exchanger for frothing the heated milk product. However, this system has the problem that the frothing is done after the milk has been heated, which therefore provides low quality milk foam. Moreover, the arrangement of the heat exchanger disclosed in this document is not compact and works with higher quantities of fluid (typically comprised between 5 and 10 liters of fluid) which makes that part of the fluid remains inside the system and can therefore be contaminated.

It is therefore an object of the invention to provide a gentle, non-destructive and powerful heating system for superior quality milk foam on demand, which is easy to operate and to clean and maintain by a user.

SUMMARY OF THE INVENTION

According to a first aspect, the invention refers to a heat transfer device for heating a fluid or fluid foam on demand comprising a path through which the fluid or the fluid foam circulates and at least one layer made of a thermally conductive material. The path is in contact with the layer in such a way that when the layer is heated it transmits heat to the fluid or fluid foam as it circulates through the path, the path and the part of the layer in contact with said path being detachably configured so that they are made accessible for being cleaned.

The heat transfer device preferably comprises a first path through which steam circulates, such that the layer is heated by the change of phase of steam into liquid when circulating through the first path.

Preferably, the heat transfer device further comprises a second path through which steam circulates and a secondary layer in contact with the second path in such a way that the secondary layer is heated by the change of phase of steam into liquid when circulating through the second path. The path and the parts of the layers in contact with said path are detachably configured so that they are made accessible for being cleaned.

According to another embodiment, the layer in the heat transfer device can also be heated by conduction and/or by radiation and/or by hot air and/or by induction.

According to another embodiment, the path in the heat transfer device can be configured having a cylindrical shape and the layer is then preferably configured as a sleeve able to slide over the path, so that both the layer and the path are made accessible for being cleaned.

Preferably, the path in the heat transfer device through which the fluid or the fluid foam circulates is configured with a labyrinth shape. Typically, the path through which fluid or fluid foam circulates and the first path and/or the second path are further configured to be complementary shaped, preferably with a labyrinth shape.

Typically, the heat transfer device further comprises a pumping and pumping and foaming device integrated in the heat transfer device, air being provided also into the pumping and foaming device. Preferably, this pumping and pumping and foaming device comprises two parts, one part movable and one part static or two parts movable relative to each other, such that a mixture of fluid and air circulates through the two parts and is subjected to shear stress allowing the foaming of the mixture.

According to a second aspect, the invention refers to a pack for providing hot fluids or hot fluid foams on demand comprising a fluid container having in its inner volume a fluid and/or a foamable fluid product, and a heat transfer device as the one described above into which the fluid is provided for being heated and optionally also foamed.

Preferably, the pack comprises one or a plurality of steam connections providing steam into the heat transfer device. Typically, the pack further comprises an air inlet providing air into the pumping and foaming device of the heat transfer device and a driving connection entraining in rotation the movable part or parts in said pumping and foaming device.

According to a third aspect, the invention refers to a machine for heating fluids or fluid foams on demand, connectable to a pack as previously described, the machine comprising: a connection suitable for receiving the pack and a heating unit transmitting heat to the pack.

According to one embodiment, the heating unit in the machine comprises a steam making unit dispensing steam into the heat transfer device. According to another embodiment, the heating unit comprises a heating element to transmit heat to the heat transfer device by conduction and/or radiation with infrared or halogen lamps and/or hot air and/or induction or the like.

Preferably, the machine further comprises a foaming driving unit able to drive the pumping and foaming device in the heat transfer device.

The machine preferably also comprises an air regulator to introduce air into the pumping and foaming device in the heat transfer device.

According to a fourth aspect, the invention further relates to a system for heating fluids or fluid foams on demand comprising a machine and a pack as the ones described previously.

BRIEF DESCRIPTION OF THE DRAWINGS

Further features, advantages and objects of the present invention will become apparent for a skilled person when reading the following detailed description of non-limiting embodiments of the present invention, when taken in conjunction with the appended drawings, in which:

FIGS. 7a-b show schematic views of another possible configuration of the fluidic path (this time configured in a cylindrical arrangement) that can be used in a heat transfer device for heating fluids or fluid foams on demand according to a third embodiment of the present invention.

FIGS. 8a and 8b show a possible configuration of a heat transfer device for heating fluids or fluid foams on demand according to the first embodiment of the present invention, where steam heating is used.

DETAILED DESCRIPTION OF EXEMPLARY EMBODIMENTS

According to a first aspect, the present invention is directed to a heat transfer device for heating fluids or fluid foams on demand in an efficient and clean way.

The heat transfer device of the invention is configured in such a way that it is removable (from the pack where it is integrated, as it will be explained later) and in such a way that, once removed, it can be easily disassembled in several parts that can be easily cleaned.

Figure 1:
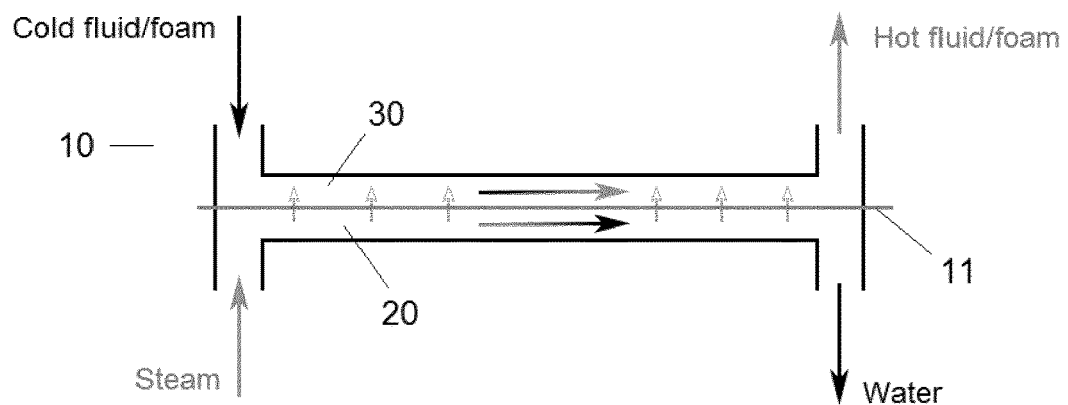
FIG. 1 shows a schematic transversal view of a heat transfer device for heating fluids or fluid foams on demand according to a first embodiment of the present invention.
Figure 4:
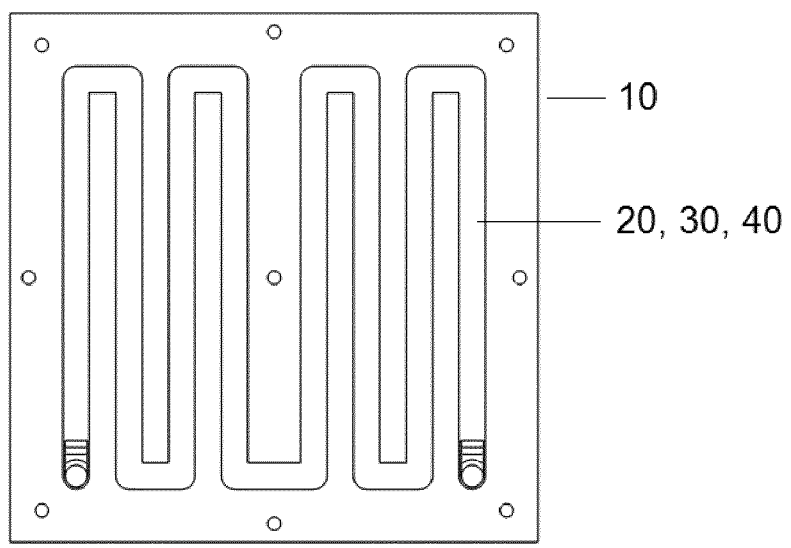
FIGS. 4-6 show schematic views of possible different configurations of the fluidic paths that can be used in a heat transfer device for heating fluids or fluid foams on demand according to the present invention.
Figure 5:
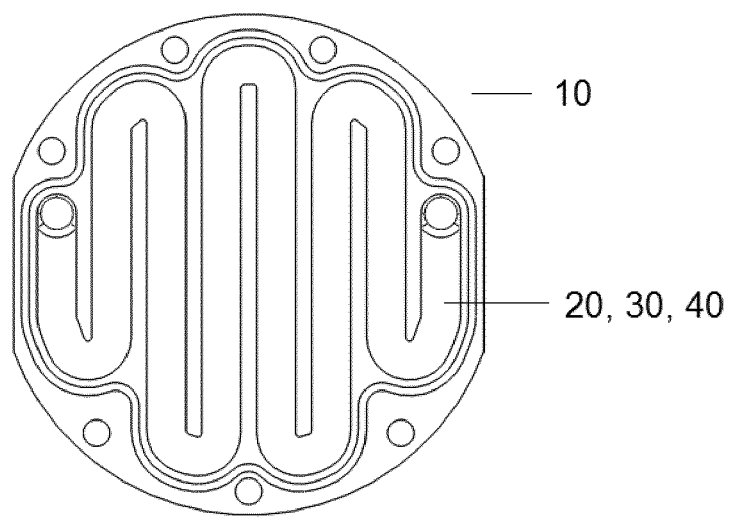
Figure 6:
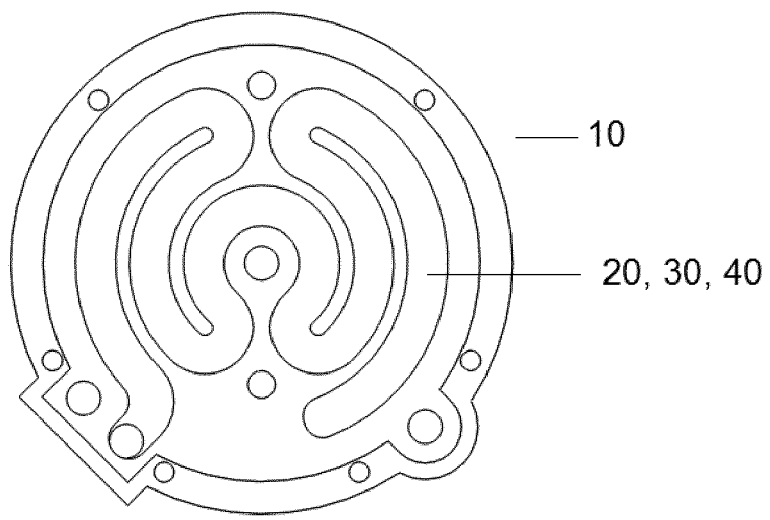

According to a first embodiment, the invention refers to a heat transfer device 10 using steam, having a sandwich construction as shown schematically in FIG. 1. This construction comprises a layer, preferably configured as quite a thin layer and called in what follows layer 11, made of a material which is able to transmit heat (preferably a metallic material), this layer 11 being interposed between a first path 20 (preferably with the shape of a labyrinth) where hot steam circulates and a second path 30 (preferably also with the shape of a labyrinth) where a fluid (preferably a liquid, typically milk) or a foam circulates. With this configuration, heat from steam in the first path 20 is absorbed by the fluid or foam in the second path 30 by means of the layer 11, working as heat transmitter medium. The first and second paths 20, 30 preferably have the same shape so that, when they are brought together with the layer 11 in between, circulation of fluid or foam in the second path 30 matches or is confronted with circulation of steam in the first path 20 and therefore heat transfer can be optimized. Preferably, the shape or configuration of the first path 20 and that of the second path 30 is made in a labyrinth-shape type, as depicted in FIG. 4, 5 or 6. However, other complementary shapes for the first and second paths 20, 30 are also possible, as long as they ensure the correct heat transfer through the layer 11.

As described, the shapes of both paths 20 and 30 are complementary, preferably identical, at least one path having a labyrinth shape, most preferably both paths 20 and 30 having labyrinth shapes.

The labyrinth shape is a preferred shape as it allows a better heat transfer by increasing the heat transfer area between the fluid or fluid foam and the layer 11.

Figure 2:
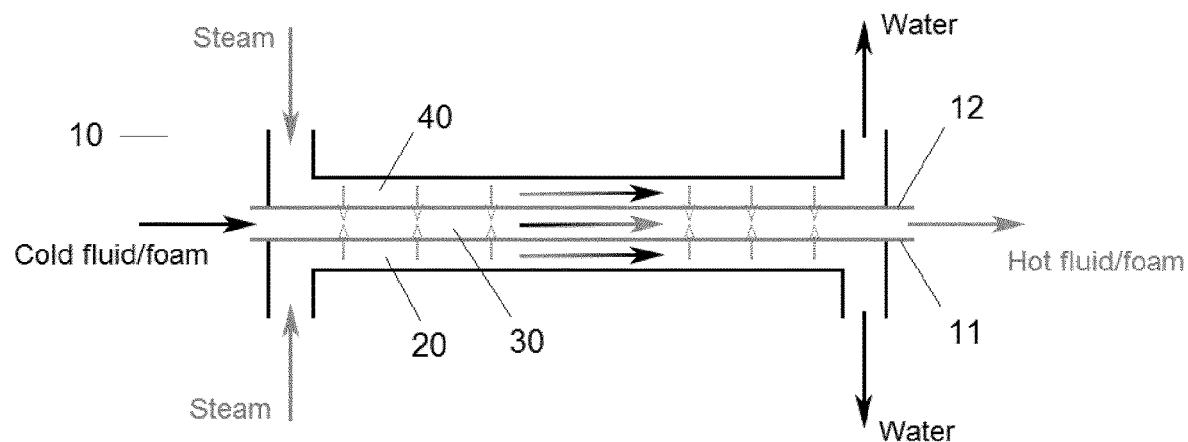
FIG. 2 shows a schematic transversal view of a heat transfer device for heating fluids or fluid foams on demand according to a second embodiment of the present invention.

According to a second embodiment, the invention refers to a heat transfer device 10 using steam, having a sandwich construction as shown schematically in FIG. 2. This construction comprises a first path 20 (preferably with the shape of a labyrinth) where hot steam circulates, a primary thin layer called primary layer 11 made of a material which is able to transmit heat (preferably a metallic material), a second path 30 (preferably with the shape of a labyrinth) where a fluid (preferably a liquid, typically milk) or a foam circulates, a secondary thin layer called secondary layer 12 made of a material which is able to transmit heat (preferably a metallic material) and a third path 40 (preferably also with the shape of a labyrinth) where hot steam circulates. With this configuration, heat from steam in the first path 20 and in the third path 40 is absorbed by the liquid or foam in the second path 30 by means of the two layers, the primary layer 11 and the secondary layer 12, both working as heat transmitters. This configuration is even more efficient than the one of the first embodiment previously disclosed, as the fluid or foam absorbs heat from two steam paths (first path 20 and third path 40) at the same time.

The first, second and third paths 20, 30 and 40 preferably have the same shape (typically, a labyrinth shape) so that, when they are brought together with the primary and secondary layers 11 and 12 interposed, circulation of fluid or foam in the second path 30 matches or is confronted with circulation of steam in the first path 20 and also with circulation of steam in the third path 40; therefore heat transfer can occur very efficiently.

As described, the shapes of the paths 20, 30 and 40 are complementary, preferably identical, at least one path having a labyrinth shape, most preferably all paths 20, 30, 40 having labyrinth shapes.

The labyrinth shape is a preferred shape as it allows a better heat transfer by increasing the heat transfer area between the fluid or fluid foam and the layers 11, 12.

The heat transfer device 10 according to any of the first or the second embodiment is preferably part of a lid or cap which is integrated into a pack or package (preferably configured as a bottle, a pouch or a pod) comprising the fluid product that will be heated and possibly also foamed. The lid or cap so configured is preferably flat and quite compact, though it has a certain thickness allowing a long lifecycle of this part so that it is not worn out rapidly and can be cleaned and reused several times. This lid or cap, integrated with the package, will be connected to a machine 200 comprising at least: a connection suitable for receiving the lid or cap (where the heat transfer device 10 is integrated), a steam making unit (typically a thermoblock and a pump) and a connection for dispensing steam into the lid or cap. Further details of such a machine 200 will be explained later.

Figure 3:
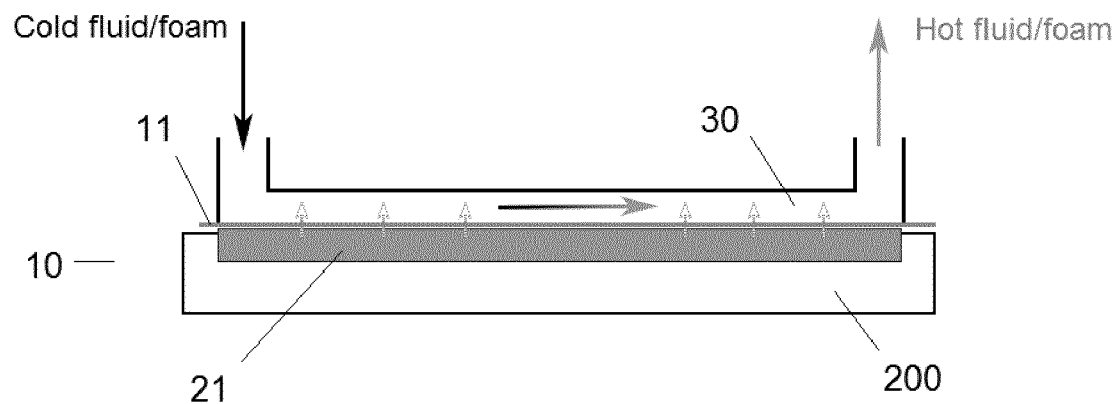
FIG. 3 shows a schematic transversal view of a heat transfer device for heating fluids or fluid foams on demand according to a third embodiment of the present invention.

According to a third embodiment, the invention refers to a heat transfer device 10 preferably using conduction, having a sandwich construction as shown in FIG. 3. This construction comprises a thin layer configured as a layer 11 made of a material which is able to transmit heat (preferably a metallic material) and a path 30 (preferably with the shape of a labyrinth) where a fluid or foam circulates. When the layer 11 is heated it transmits heat to the foam or fluid circulating through the path 30. The layer 11 is heated by means of a corresponding heating element 21 arranged in the machine 200 to which the heat transfer device 10 is associated, as it will be further explained. Therefore, the layer 11 works as a heat transmitter medium, as in the previous embodiments.

FIGS. 7a and 7b show another exemplary embodiment of a cylindrical arrangement that can be used for the fluidic path (i.e. for the path 30 where the fluid or foam circulates) for a heat transfer device 10 according to the third embodiment of the invention. In such embodiment, the fluid or fluid foam will circulate through the path 30 in the heat transfer device 10 and will be heated by a heating element 21 arranged in a corresponding machine 200. Different heating technologies can be used for the heating element 21, such as conduction, induction, hot air or radiation, amongst others.

Not only conduction but any other means able to transmit heat to the layer 11 can also be used and should therefore be comprised within the scope of protection of the present application, such as radiation using infrared or halogen lamps, hot air, induction, etc.

The arrangement disclosed for this heat transfer device 10 according to the third embodiment is preferably part of a lid or cap which is integrated into a pack or package (preferably a bottle, a pouch or a pod) comprising the fluid product which is to be heated and possibly also foamed. The lid or cap so configured is preferably flat and quite compact, though it has a certain thickness allowing a long lifecycle of this part so that it is not worn out rapidly and can be cleaned and reused several times. The lid or cap, integrated with the package, is connected to a machine 200 comprising at least: a mechanical connection to receive the lid or cap and a heating element 21 transmitting heat to the lid or cap (to the layer 11 in the lid or cap). Further explanation and details of the machine 200 will follow.

As previously disclosed, the first and second embodiments use steam as heating source to provide heat to the layer 11 or to the primary and secondary layers, 11 and 12. The steam transmits heat very efficiently to the layer or layers by changing phase from steam to liquid (water), allowing that the length of the path or paths decreases and, where the active surface for heating transfer is extended by using a labyrinth shape so that the lid or cap where the configuration of the invention is integrated is maintained quite compact. Therefore, the heating of the fluid or foam is done in direct flow, and without any contact between the machine or device and the product, thus providing an easy solution for the consumer for cleaning, as it will be further explained in more detail. Water resulting from the steam phase change can be either mixed with the product (fluid or foam to be dispensed) or can be directed towards a drip tray in order to be removed at a later stage.

The approach used in the third embodiment uses a heating element 21 in the machine 200 against which the layer 11 is pressed to become hot, so that the fluid or steam becomes hot when it circulates through the path 30 in contact with the layer 11. Once again, this embodiment allows that heat is transferred to the fluid or foam without contact between the product and the machine 200, thus providing an easy solution for the consumer for later cleaning.

Figure 11:
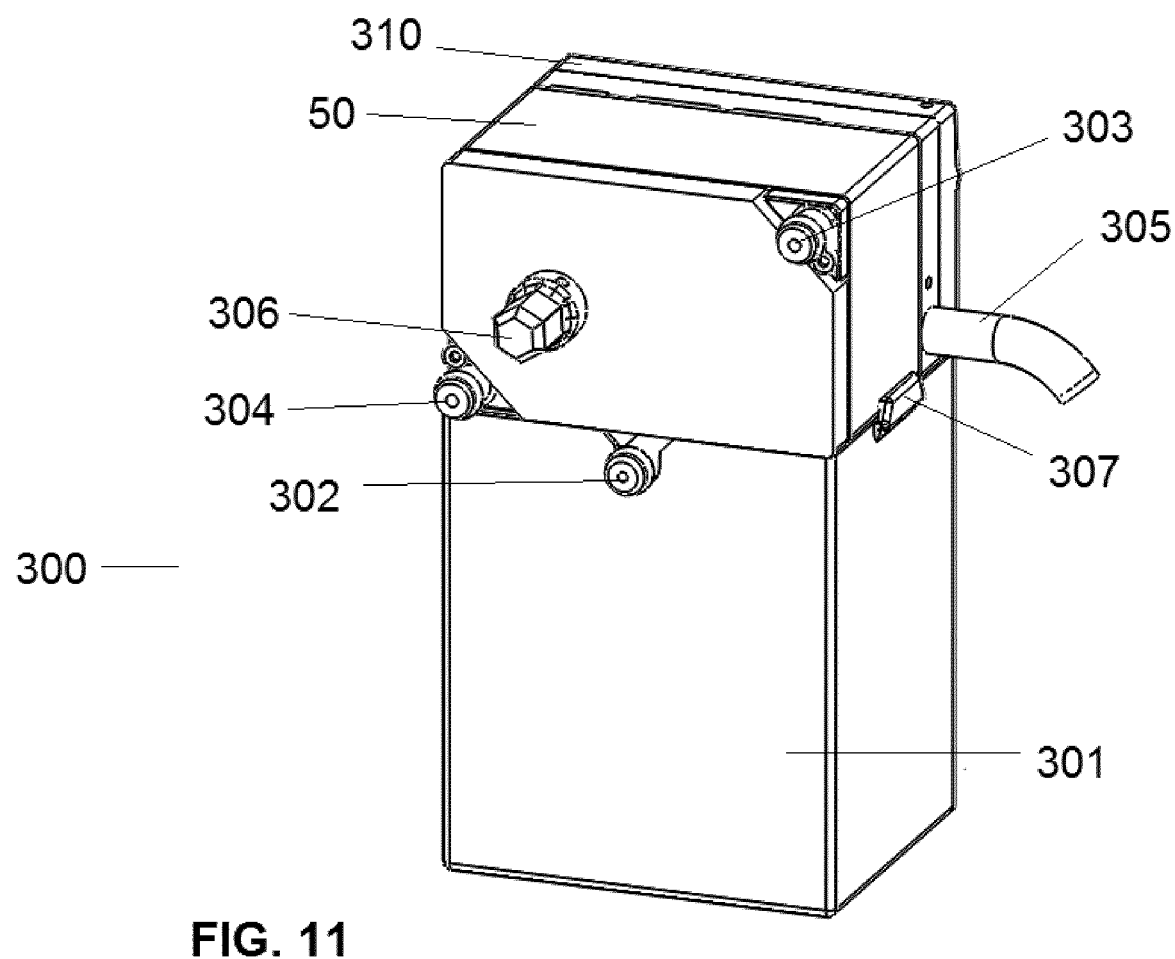
FIG. 11 shows a schematic view of a pack for heating fluids or fluid foams on demand according to the present invention, comprising a fluid container and a heat transfer device according to the first embodiment.

According to a second aspect, the present invention is directed to a pack 300 for providing hot fluids or fluid foams on demand, as represented for example in FIG. 11. The pack 300 is preferably configured as a bottle as it will allow multiple dosing and a plurality of usages; however, it can also be configured as a pouch or as a pod. The pack 300 comprises a fluid container 301 comprising in its inner volume a fluid product that will be heated and possibly also foamed. Fluid can be introduced in the container 301 before the pack is going to be used and the full pack can be disassembled later for cleaning and for being prepared for a further use. Further explanation of this cleaning will follow.

FIG. 11 represents a pack 300 configured according to the first embodiment of the present invention. The pack 300 comprises a fluid container 301 where the fluid to be heated and possibly also foamed is introduced. The heat transfer device 10 is arranged on top of the container 301, configured as a lid or cap, in quite a compact way. The heat transfer device 10 comprises a heating unit 310 and also preferably a pumping and foaming device 50.

The pack 300 also typically comprises a fluid outlet 305, an air inlet 302, one or a plurality of steam connections 303, 304 and a driving connection 306.

Figure 9:
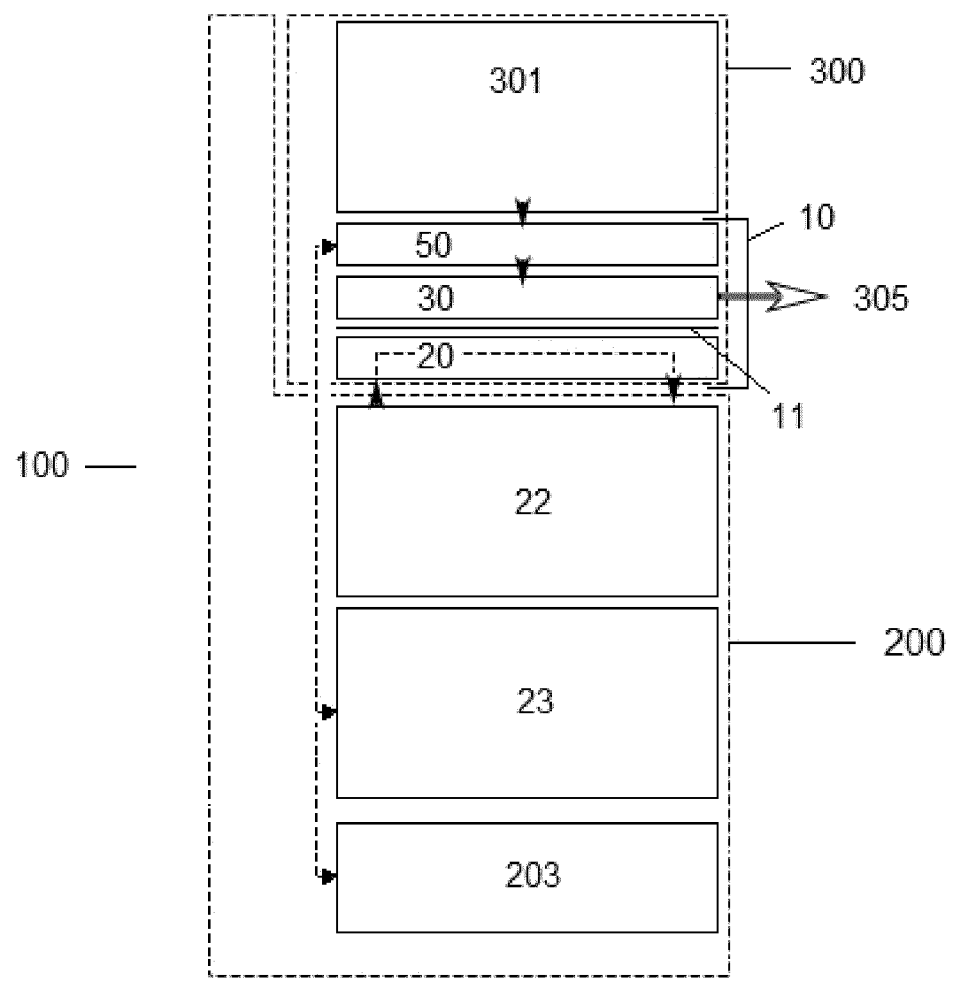
FIG. 9 shows a schematic view of a system for heating fluids or fluid foams on demand according to the present invention, integrating a heat transfer device for heating fluids or fluid foams on demand according to the first or the second embodiment.

With reference to the embodiment shown in FIG. 11 together the overview of the system shown in FIG. 9, the fluid comprised inside the volume of the container 301 is directed into the heat transfer device 10, particularly into the heating unit 310, where it flows through the second path 30 and is confronted with a layer 11 which is heated by means of the phase change of the steam circulating through the first path 20. Steam is provided into the first path 20 and it flows out through the fluid outlet 305, typically into a cup or appropriate recipient. In this case described, the fluid circulating through the heat transfer device 10 is only heated, not foamed, and the air inlet 302 is closed.

There is also the possibility of heating and foaming the fluid inside the container 301. In this case, as schematically represented in FIG. 9, the fluid is directed first from the container 301 into the pumping and foaming device 50, where it is mixed with air coming from the air inlet 302 and the mixture is foamed in the cited pumping and foaming device 50. Typically, the pumping and foaming device 50 comprises at least two parts movable relative to each other (either one part is static and another part is rotatable with respect to it, or both parts are rotatable with respect to each other): the mixture of fluid and air is driven through shear stress in the space between the two parts and is therefore foamed by Couette Flow effect. The two movable parts or the only movable part is entrained in rotation by the driving connection 306. Once the mixture of fluid and air has been foamed, it is driven into the heat transfer device 10 where it is heated by circulating through the second path 30, contacting the layer 11 heated by the steam circulating through the first path 30, as described previously. Once the mixture has been heated and foamed, it exits the pack 300 through the fluid outlet 305.

Figure 12A:
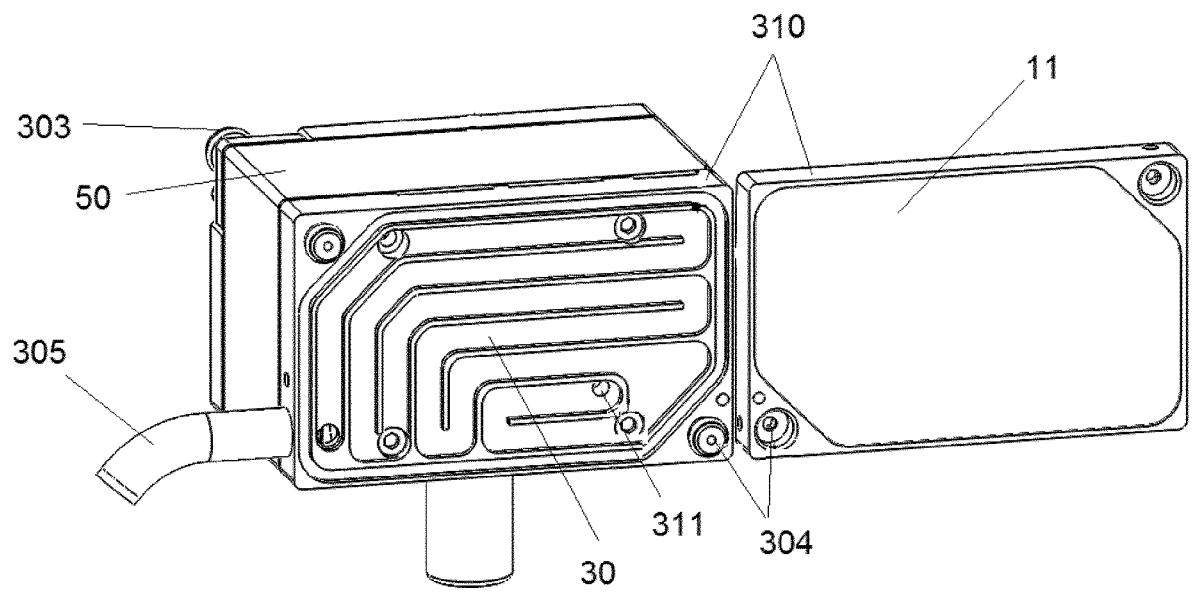
FIGS. 12a-b show different views of an open heat transfer device for heating fluids or fluid foams on demand according to the first embodiment of the invention, comprised in a pack as shown in FIG. 11.
Figure 12B:
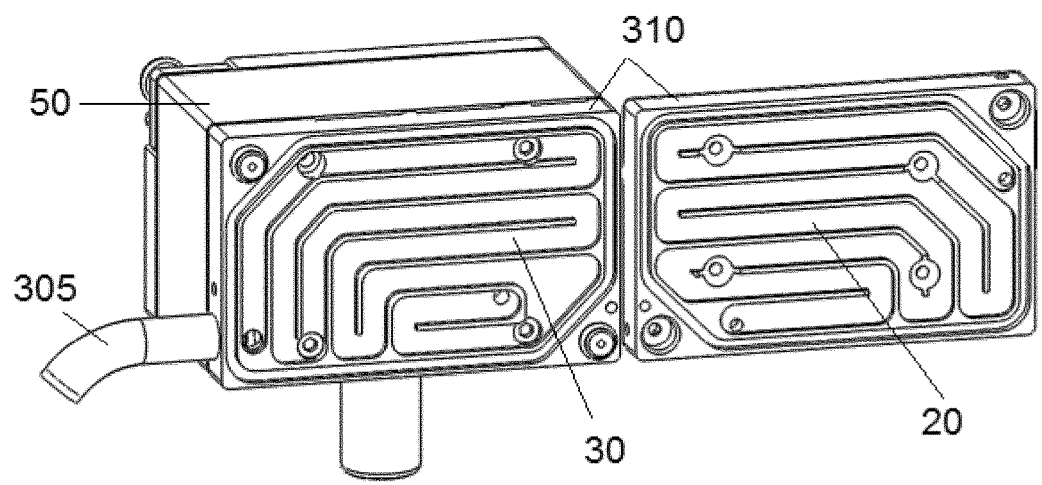

For the cleaning of a pack 300 as the one described and shown in FIG. 9, different parts of it are easily disassembled for an easy cleaning. The fluid container 301 can be easily separated from the pack 300 acting on tabs or flanges 307, as shown in FIG. 11. Once disassembled, the inner volume of the container 301 can be washed or can be cleaned in a dishwasher, for example. In the heat transfer device 10, the layer 11 is preferably attached to the first path 20, so both are separated at the same time: only the external part of the layer 11, contacting the fluid path (second path 30) needs to be cleaned, but it can easily be done by a cloth or the like, as it remains flat. It is evident that the inner part comprising the first path 20 through which steam circulates remains perfectly clean, as no fluid is conveyed through it, as it can be seen in FIG. 12*b*. Also as represented in FIG. 12*a* or 12*b*, once the layer 11 with the first path 20 are separated, access is given to the second path 30 for its easy cleaning, as fluid has circulated through it.

Typically, the fluid outlet 305 is also made removable from rest of the pack 300 and the heat transfer device 10, also to facilitate its cleaning.

Furthermore, the pumping and foaming device 50 in the heat transfer device 10 is made also disassembled in several parts that can be easily cleaned. Typically, when there is a rotating part and a static part, the rotating part is made removable from the static one, such that it can be cleaned in an easy way while giving access at the same time to the surface of the static part that was in contact with fluid and which needs to be cleaned.

A similar configuration as to the one shown in FIG. 11 can be previewed for a pack 300 according to the second embodiment of the invention, where the heat transfer device 10, in particular the heating unit 310 would have a configuration as the one depicted in FIG. 2. Similarly to what has been described previously, the container 301 can be disassembled and cleaned, and the fluid outlet 305 would be also preferably made removable for its easy cleaning. In a similar way, the pumping and foaming device 50 would also be detachable for its internal cleaning, as previously explained.

The heating unit 310 will be detached in two parts, each part comprising a flat layer (primary layer 11 and secondary layer 12) that will be accessible for being cleaned and that will be easily cleanable as it presents a flat surface. Behind both layers the first path 20 and the third path 40 will be arranged for the circulation of steam, but there is no need to detach or disassemble these parts as no fluid circulates inside them. Once the parts are detached, the second path 30 through which fluid circulates (the fluid or fluid foam enters the heating unit 310 through the fluid inlet 311) is made again accessible as in the first embodiment shown in FIGS. 12*a* and 12*b* so that it can be easily cleaned. Also for this configuration, steam will be provided into the paths 20 and 40 through the steam connections 303, 304. Similarly, air would be provided to the pumping and foaming device 50 through an air inlet 302, and the rotating part in the pumping and foaming device 50 will be entrained in rotation by a driving connection 306. When foaming occurs in such a configuration, the fluid from the container 301 is directed into the pumping and foaming device 50 previously entering the second path 30, i.e. previously to being heated.

When a heat transfer device 10 according to the third embodiment of the invention (according to FIG. 3) will be implemented in a pack 300, in particular the heating unit 310 will comprise a second path 30 through which the fluid will circulate and a layer 11 made essentially flat. The layer 11 will then be contacted with a heating element 21 in the machine 200 in order to be heated. Different means are possible for configuring the heating element 21: conduction, radiation using infrared or halogen lamps, hot air, induction, etc.

In such a configuration, the layer 11 will be detachable from the second path 30 (will possibly be configured thicker in order to allow this), so that the part of the layer 11 in contact with the fluid will be easily cleaned (it is configured substantially flat) and the second path 30 will be accessible for cleaning. No other parts of the pack 300 are in contact with the fluid so they do not need to be cleaned. As in previous embodiments, the pumping and foaming device 50 will be accessible inside to be cleaned and the fluid outlet 305 will also be made removable from the pack 300 to allow its cleaning. Similarly, the container 301 will be detachable from the heat transfer device 10 and will be easily cleanable too.

Figure 10:
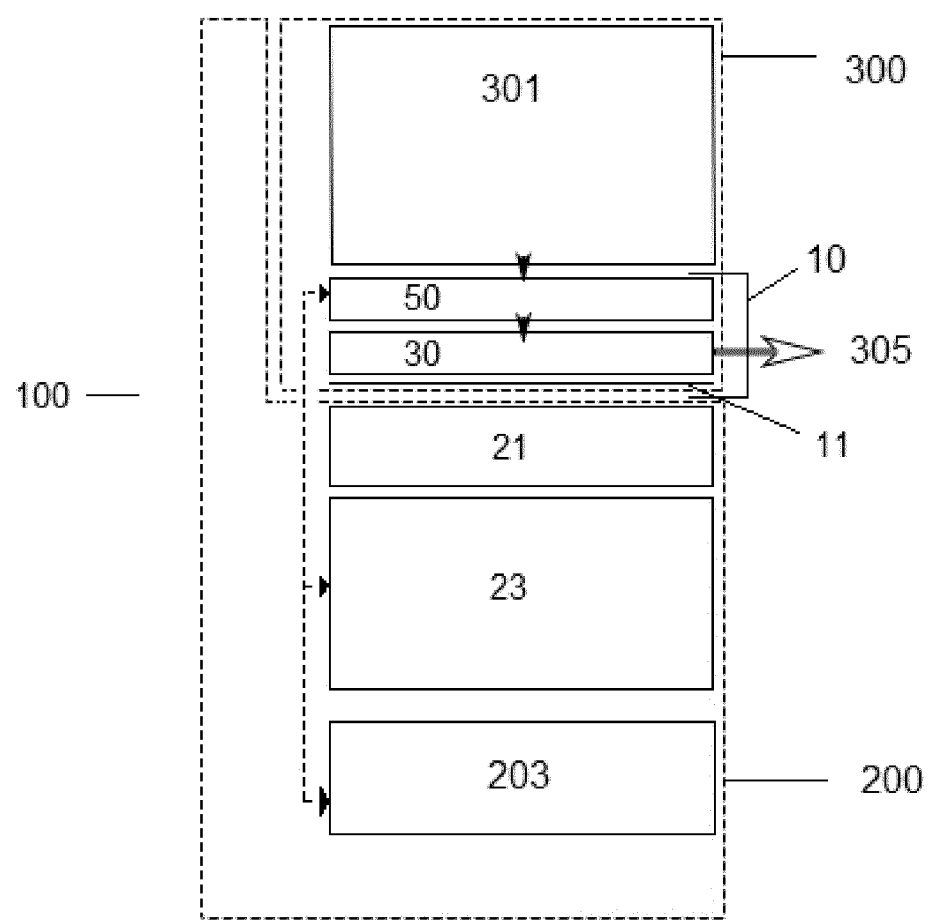
FIG. 10 shows a schematic view of a system for heating fluids or fluid foams on demand according to the present invention, integrating a heat transfer device for heating fluids or fluid foams on demand according to the third embodiment.

When the fluid is also foamed, foaming will take place prior to the fluid (in this case, fluid foam) entering the second path 30, as schematically represented in FIG. 10.

According to a different embodiment, the fluid path (second path 30) can be arranged cylindrically, as represented in FIGS. 7*a* and 7*b*. In this case, the layer 11 will be arranged around the cylindrical path 30 shaped as a sleeve, such that this sleeve can be made slidable with respect to the path 30 in order to allow a proper and easy cleaning of the part of the sleeve in contact with the fluid and also of the second path 30 through which the fluid or fluid foam has circulated.

Figure 13:
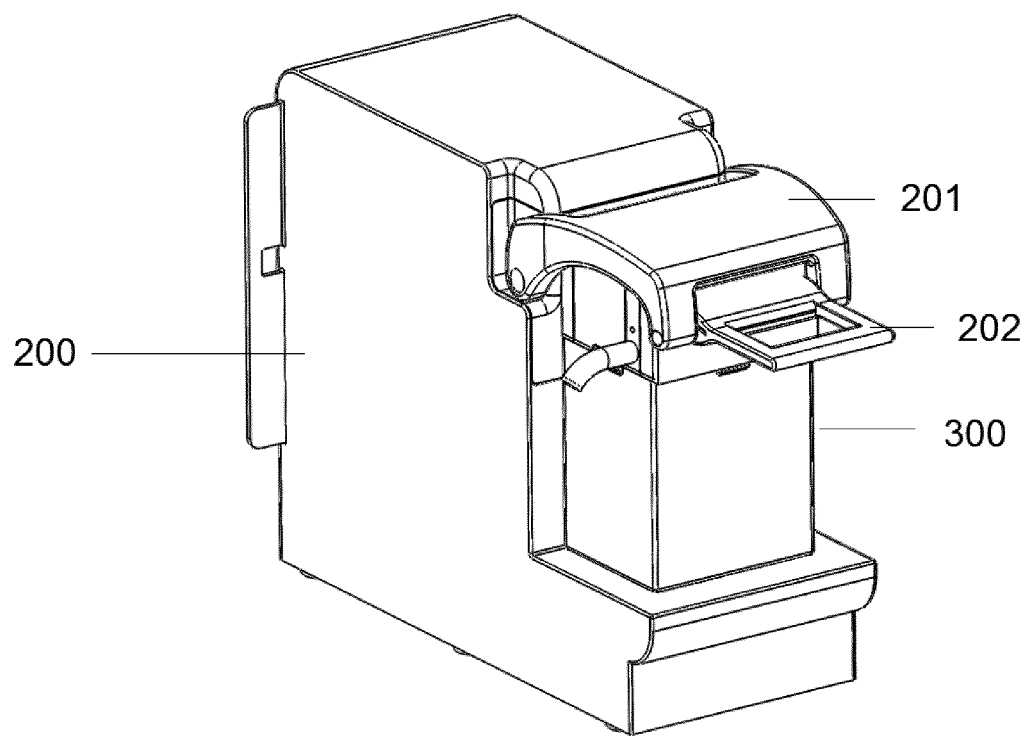
FIG. 13 shows a schematic view of a complete system for heating fluids or fluid foams on demand according to the present invention, comprising a pack with the fluid and the heat transfer device and a processing machine.

According to a third aspect, the present invention is directed to a machine 200 for heating fluids or fluid foams on demand in an efficient way. A schematic representation of such a machine 200 is shown in FIG. 13. The pack 300 comprising a container 301 with fluid and a heat transfer device 10 preferably arranged on top of it is connected to this machine 200.

As schematically shown in FIG. 10, the machine 200 to which the pack of the invention will be connected, in particular to which the heat transfer device 10 will be connected comprises at least:
  a mechanical connection suitable for receiving the lid or cap where the heat transfer device 10 is integrated, typically a locking mechanism 201 preferably also comprising a handle 202 for facilitating its closing over the device 10;
  a steam generator or steam making unit 22 (typically a thermoblock and a pump) for dispensing steam through the steam connections 303, 304 into the lid or cap for the first and second embodiments using steam heating; or a heating element 21 transmitting heat from the heating element to the lid or cap, for the third embodiment using conduction, radiation with infrared or halogen lamps, hot air, induction or the like;
  optionally, a foaming driving unit 23 driving the corresponding pumping and foaming device 50, in particular entraining in rotation the movable part or parts of the pumping and foaming device 50 in the lid or cap to carry out foaming;
  also optionally, an air regulator 203 to introduce air into the pumping and foaming device 50 through the air inlet 302 so that the mixture of fluid (from the container 301) and air is foamed.

The fluid comprised in the pack according to the invention can also have a certain flavor, so the outcome from the pack would be a flavored, hot and possibly also foamed beverage.

As schematically shown in FIG. 9, when the fluid product would be foamed it would be first directed to a pumping and foaming device 50 where a mixture of this fluid together with air provided through the air inlet 302 into the pumping and foaming device 50 would be foamed. From there, the foamed mixture would be directed into the second path 30. When the fluid would not be foamed, the air inlet (because pumping is needed anyway) of the pumping and foaming device 50 would simply not be activated and the fluid would be directed into the second path 30. By its flow through the second path 30, the fluid or foamed fluid product would be heated by the primary layer 11 (first embodiment) or by the primary and secondary layers 11, 12 (second embodiment) and would be directed into the cup or appropriate recipient. The pumping and foaming device 50 of the invention works in such a way that, when it is activated together with the air inlet, the mixture of fluid and air is pumped and also foamed; when the air inlet is not activated, the mixture of air and fluid through the device 50 is then only pumped not foamed.

The machine 200 to which the pack is connected comprises a steam generator 22 and a foaming driving unit 23, as shown in FIG. 9. Preferably, the pumping and foaming device 50 would be configured as a rotatable part rotating with respect to a stationary part or as two rotatable parts rotating with respect to each other, such that the mixture of air and fluid comprised between the two parts would be subjected to a shear stress that would produce foaming by Couette Flow effect. Preferably, these parts would be preferably shaped as discs or cylinders. The rotatable part (or both rotatable parts) would be driven in rotation by the foaming driving unit 23, typically a motor.

Similarly, FIG. 10 represents a pack according to the invention comprising in its inner volume a fluid product that will be heated and possibly also foamed, together with a lid or cap into which a heat transfer device 10 is integrated.

As schematically shown in FIG. 10, when the fluid product would be foamed it would be first directed into a pumping and foaming device 50 where it would be mixed with air coming from the air inlet 302 into the pumping and foaming device 50, the mixture of fluid and air being foamed and then directed into the second path 30. When the fluid would not be foamed, the air inlet of the pumping and foaming device 50 would simply not be activated and the fluid would be directed into the second path 30. By its flow through the second path 30, the fluid or foamed fluid product would be heated by the layer 11 that is heated by the corresponding heating element 21 (third embodiment) and would be directed into the cup or appropriate recipient. Heating of the heating element 21 would be done by conduction, radiation using infrared or halogen lamps, hot air, induction or the like.

The machine 200 to which the pack is connected comprises a heating element 21 and a foaming driving unit 23, as shown in FIG. 10. Also preferably, the pumping and foaming device 50 would be configured as a rotatable part rotating with respect to a stationary part (it is also possible that it comprises two parts rotating with respect to each other), such that the mixture of air and fluid comprised between the two parts would be subjected to a shear stress that would produce its foaming by Couette Flow effect. Preferably, the rotatable part and the stationary part (or the two rotatable parts) would be shaped as discs or cylinders. The rotatable part (or both rotatable parts) would be driven in rotation by the foaming driving unit 23, typically a motor.

Yet according to a fourth aspect, the present invention is directed to a system 100 for providing hot fluids or fluid foams on demand in an efficient way, allowing easy cleaning of those parts in contact with the fluid or fluid foam, as shown in FIG. 13.

The system 100 comprises a pack 300 as previously described (the pack integrating the heat transfer device 10) and a machine 200 to which the pack is connected.

Some of the advantages of the system of the invention, as already related before, are now summarized in what follows:
  the system is able to provide hot fluid or hot fluid foam on demand;
  there are no parts of the machine that are in contact with the fluid or the fluid foam (the system is configured in direct flow or in-line), which minimizes cleaning operations required;
  the parts of the pack that are in contact with the fluid or fluid foam are made easily disassembled so they can be easily cleaned or easily accessible to be cleaned;
  the fluid foam is heated very gently (thus being provided with a very high quality) as there is no direct contact between the foam and the heating source;
  contamination is avoided as the pack can be easily cleaned after each operation or dosing.

Although the present invention has been described with reference to preferred embodiments thereof, many modifications and alterations may be made by a person having ordinary skill in the art without departing from the scope of this invention which is defined by the appended claims.

LIST OF REFERENCES

100 Fluid or fluid foam heating system on demand
  10 Heat transfer device
    11 Primary layer
    12 Secondary layer
  20 First path (steam)
  30 Second path (fluid or fluid foam)
  40 Third path (steam)
  50 Pumping and foaming device
200 Machine
  201 Locking mechanism
  202 Handle
  203 Air regulator
  21 Heating element
  22 Steam generator
  23 Foaming driving unit
300 Pack
  301 Fluid container
  302 Air inlet
  303 Steam connection
  304 Steam connection
  305 Fluid outlet
  306 Driving connection
  310 Heating unit
  307 Tab, flange
  310 Heating unit
  311 Fluid inlet

The invention claimed is:

1. A system comprising a machine for a heating fluid or fluid foam on demand,
the system further comprising a pack for providing hot fluids or hot fluid foams on demand,
the pack comprising a fluid container having a fluid or a foamable fluid product in an inner volume of the fluid container, and
the pack further comprising a heat transfer device for heating the fluid or the fluid foam on demand, the heat transfer device comprising:
a path through which the fluid or the fluid foam circulates;
at least one layer made of a thermally conductive material; and
at least one additional path through which steam circulates, each of the at least one additional path has the same shape as the path, the path being in contact with a part of the at least one layer, wherein the at least one layer is sandwiched in between the path and the at least one additional path in such a way that when the at least one layer is heated the at least one layer transmits heat to the fluid or fluid foam as the fluid or fluid foam circulates through the path, the at least one layer is arranged such that a change in phase of the steam into liquid when circulating through the at least one additional path heats the at least one layer;
wherein the path and the part of the at least one layer in contact with the path are detachably configured so that they are made accessible for being cleaned,
the machine comprising a connection suitable for receiving the pack and further comprising a heating unit having a steam generator disposed within the machine configured for dispensing the steam into the heat transfer device such that the heat transfer device circulates the steam through the at least one additional path, and a foaming driving unit having a motor configured to rotate a rotatable part of a pumping and foaming device in the heat transfer device such that the fluid or fluid foam is circulating through the path.

2. The system according to claim 1, wherein the machine comprises an air regulator configured to introduce air into the pumping and foaming device in the heat transfer device.

* * * * *